(12) United States Patent
Guardino

(10) Patent No.: US 9,365,439 B1
(45) Date of Patent: Jun. 14, 2016

(54) PROCESSING UNIT AND METHOD UTILIZING THE SIMULTANEOUS APPLICATION OF ELECTROMAGNETICS, OXIDATION AND ELECTROLYTICS, (EMOERU), TO REMOVE CONTAMINANTS FROM AN AQUEOUS WASTE STREAM

(71) Applicant: Christine Guardino, Arnold, CA (US)

(72) Inventor: Christine Guardino, Arnold, CA (US)

( * ) Notice: Subject to any disclaimer, the term of this patent is extended or adjusted under 35 U.S.C. 154(b) by 156 days.

(21) Appl. No.: 14/203,200

(22) Filed: Mar. 10, 2014

Related U.S. Application Data

(60) Provisional application No. 61/780,157, filed on Mar. 13, 2013.

(51) Int. Cl.
*C02F 1/46* (2006.01)
*C02F 1/465* (2006.01)

(52) U.S. Cl.
CPC ..................... *C02F 1/465* (2013.01)

(58) Field of Classification Search
CPC ..................................... C02F 1/465
See application file for complete search history.

(56) References Cited

U.S. PATENT DOCUMENTS

| | | | |
|---|---|---|---|
| 4,053,378 A | 10/1977 | Moeglich et al. |
| 4,094,755 A | 6/1978 | Moeglich |
| 4,293,400 A | 10/1981 | Liggett |
| 4,329,111 A | 5/1982 | Schmid |
| 4,378,276 A | 3/1983 | Liggett et al. |
| 4,872,959 A | 10/1989 | Herbst et al. |
| 5,043,050 A | 8/1991 | Herbst |

*Primary Examiner* — Arun S Phasge
(74) *Attorney, Agent, or Firm* — Larry E. Henneman, Jr.; Henneman & Associates, PLC

(57) ABSTRACT

An improved method and apparatus for the removal of both suspended and dissolved contaminants be they heavy metals, organics, inorganics, hydrocarbons and others from various types of waste stream, wash water, ground water, leach waters, process waters and etc. is illustrated. The method combines passing the aqueous waste stream through an electromagnetic field, an ozone/oxygen venturi injector for oxidation and then through a horizontal flow and vertical fall with a horizontal plate maze unit of alternately electrically charged plates, anode and cathode. The plates will be charged, selectively: by either DC or AC Voltage and Current. There will be provisions for installation of a framework to mount and support a polar/bi-polar membrane, divider or separator as may be required to enhance special treatment of particular aqueous waste streams.

17 Claims, 4 Drawing Sheets

PROCESSING UNIT AND METHOD UTILIZING THE SIMULTANEOUS APPLICATION OF ELECTROMAGNETICS, OXIDATION AND ELECTROLYTICS, (EMOERU), TO REMOVE CONTAMINANTS FROM AN AQUEOUS WASTE STREAM

REFERENCE TO RELATED APPLICATIONS

This patent application claims the benefit of U.S. Provisional Patent Application Ser. No. 61/780,157 filed Mar. 13, 2013.

TECHNICAL FIELD

The present invention relates to the field of cleaning aqueous waste streams, and more specifically, provides a processing unit for aqueous waste streams which improves the flocculation and separation of contaminants by increasing the amount and size of the floc, which provides for much improved separation and removal of contaminants from the aqueous waste stream.

BACKGROUND

The present invention is a processing unit for the electrolytic treatment of aqueous waste streams employing the effects of three technologies; electromagnetics, oxidation and electrolytics (EMOERU) taking place in the proper order in a single processing unit fabricated of materials which are chemically inert. The inventive processing unit treats aqueous solutions in the correct order specific to the contaminant to be removed, and if required for specific contaminants, an additional filter utilizing nanotechnology can be attached to the processing unit to further filter the aqueous stream as it exits the unit.

Electro-(coagulation, precipitation or flocculation) entered into commercial application with Cottrell's smoke stack dust precipitator in the late 1800's. One of the best representations of the art as applied to fluids is the Liggett patent, U.S. Pat. No. 4,293,400. All others are some variation of the basic concept. Some of the best documentation of the results of Electroflocculation was presented in U.S. Pat. No. 4,872,959 titled "Electrolytic Treatment of Liquids" as presented by Robert J. Herbst and Russell R. Renk with their patent of the "tube within a tube" configuration. However the time consuming maintenance required by this configuration, cost of special parts fabrication, difficulty locating close tolerance tubing and maintaining proper clearance between the inner and outer tubes necessitated that a better solution be found. In U.S. Pat. Nos. 4,293,400, 4,378,276 and 4,872,959 there are described devices for applying an electric field to a liquid flowing through the devices. These devices employ the tube within a tube configuration. In U.S. Pat. No. 5,043,050, which is by Robert J. Herbst, all of the many noted problems of cost, material acquisition and difficulties of maintenance of the tube within a tube device are quite well covered.

There have been many methods put forward for the removal of contaminants from aqueous waste streams. There exist many forms and shapes of electrocoagulators. Most electrocoagulation (Electroflocculation) units are quite difficult to maintain and clean out. This must be accomplished on a regular basis if the units are to perform correctly. As a solution to this, some have advocated using chemicals while others have added a fluidized bed of conductive particles to aid in eliminating this problem. This usually just introduces a new problem.

U.S. Pat. Nos. 4,053,378, 4,094,755 and 4,329,111 describe using flat plates and fluidized beds. The flat plate device patents discuss the need for caution due to maintenance problems encountered caused by buildup of solids from the waste stream on the carbon granules used in the fluidized bed. All of these devices are single technology treatment units.

The present invention not only helps to solve the flow problems present in the prior art but also greatly increases the overall contaminant removal rate. The electromagnetic ionic realignment improves flocculation and reduces scaling depositions on the charged treatment plates. The microscopically bubbled ozone aids in the turbulence and the rapid formation of hydroxyl radicals as a result of oxidation, which accelerates flocculation and chemical reduction of the contaminants. Polarity, anode and cathode, reversal reduces plating action on the charged treatment plates. The physical design of the inventive processing unit is such that visual inspection, maintenance and occasional plate replacement is quite easy and rapid.

SUMMARY OF THE INVENTION

The invention has been designed with the following principal advantages: improvement of processing, reduction of fouling, facilitation of visual inspection and simplification of maintenance by the utilization of the synergistic effects of the technologies of electromagnetics, oxidation and electrolysis, (EMOERU), while allowing more flexibility in processing different types of aqueous waste streams by employing multiple types of interchangeable treatment plates depending on the type of aqueous waste stream being processed. The physical design of the flow through horizontal maze processing unit is such that maintenance and occasional plate replacement is quite easy and rapid. The maze is designed to take full advantage of physical laws and physicochemical reactions by utilizing a series of horizontal maze flow channels constructed with a vertical descent to each succeeding flow channel to fully utilize the effect of the fluid flow against the natural rise of the extremely fine Venturi injected Ozone/Oxygen bubbles as required for a particular contaminant.

By utilizing a strong electromagnetic field along with saturating the fluid stream with microscopic ozone/oxygen bubbles, (the (EMO) section of (EMOERU)), combined with automatic and systematic polarity reversal of the treatment plates, it has been possible to dramatically reduce the major buildup problems. In addition, the ozone bubbles are in constant agitation of the fluid stream exposing more of the fluids to the treatment plates. The ozone also enhances the formation of the hydroxyl radicals and hydroperoxides, which accelerate and aid in the formation of floc and oxidation of almost all contaminants. All of this is accomplished by the synergistic interactions and reactions of the three technologies being applied simultaneously within the processing unit.

Reaction rates are influenced differently by AC or DC treatment depending on the type of contaminants present. It is important to supply an adequate power source to meet the demands of the waste stream. What will control the required current and voltage supplied to these plates is as follows: Voltage will have to be set at a sufficient level to drive the required current through the fluid stream. This is a function of the distance between the treatment plates. The current demand is the amount of Amps required to properly remove all contaminants from the fluid stream. This is a function of the conductivity of the contaminated stream itself, which is in turn the function of conductivity of the combination of types of contaminants (suspended and dissolved solids in the waste stream) and the quantity of the contaminants (concentrations). This will indicate the electron charge requirements to either change state or cause flocculation and sedimentation of the dissolved and suspended solids, which make up the contaminants of a particular fluid stream. In most cases the fluid stream will, due to its conductivity, draw the current required for proper processing.

The removal of contaminants is quite often directly affected or controlled by the pH of the stream. Before the contaminated stream is sent to the processing unit the pH, if need be, can be adjusted as required for the best removal by any of the commonly known methods of pH adjustment.

Actual physical dimensions of the processing unit will be dependent on the desired treatment flow as well as the number of treatment plates used in the unit. The plate thickness, width and length as well as space between plates, may be varied to meet specific removal requirements. The processing unit is designed with horizontal flow maze channels with a vertical descent between each succeeding maze flow channel, thus taking full physical advantage of the downward fluid flow against the natural rise of the Venturi-injected minute ozone bubbles to attain maximum ozone contact time within the unit. When used for a specific and constant waste stream, the unit can be specifically designed to be more efficient at removal of very specifically targeted contaminants.

The processing unit itself is constructed of non-conductive material that is resistant to acids, caustics, organic and inorganic chemicals and contaminants, solvents, chlorinated hydrocarbons and oxidation by ozone. The sidewalls are grooved, while the ends of the treatment plates engage the grooves and a highly conductive metal contact to hold the treatment plates in place. Every other channel and plate will nest in one end and stop short of other end, while the alternate plate and channel will nest in the other end and stop short of the other end to create the horizontal maze flow in the unit.

The aqueous waste stream is introduced into the top of the processing unit through an inlet conduit which communicates with the interior of the processing unit and allows flow through of the aqueous waste stream to a horizontal maze of treatment plates. A number of flow channels exist in the horizontal maze and flow proceeds from channel to channel falling vertically to the outflow point on bottom where an output conduit has been attached to receive the outflow. Attached to the output conduit is a U-shaped pipe which extends from tank side and rises to the top of the treatment area top level and in an inverted configuration, descends to connect just beyond where the bottom drain cut-off valve is attached. This allows the free flow output after the treatment unit is full and as long as fluid continues to enter the unit, when input fluid flow stops then the drain cut-off valve opens to allow the treatment unit to drain completely through the treatment outflow point.

On the end of the entry pipe a venturi injector is mounted to the unit entry to inject ozone/oxygen directly into the fluid flow as it enters into the process unit. Connected directly to the venturi injector, so as to accomplish ionic alignment before blending the ozone is an electromagnet sized to system flow. An electromagnet is utilized as it has proven to be more effective at ionic alignment than a permanent type magnet. Liquid flow pressure is monitored by pressure gauges.

The treatment plate maze arrangement is as follows: An aqueous waste stream enters the processing unit at its top. The maze is so arranged that the flow is lengthwise of the unit. Flowing from one end to the other end around the end of each treatment plate and downward into the next horizontal maze flow channel. This continues in a downward manner until the last flow channel is reached. The waste stream then exits out of an output pipe. The various flow channels are bordered by plates of opposite polarity, one plate being an anode and the other a cathode. In the center of each flow channel frames containing membranes can be installed as may be required for treatment of specific waste streams. These may be "doped" (chemically impregnated or other type of treatment but not limited to nanofiltration, nanoparticles or enhanced nano-magnetic particles) screens or other forms.

The method of plate installation allows the use of many types of anode and cathode plates. It is possible to use multiple treatment plate configurations to meet the removal parameters of the contaminants being treated.

DETAILED DESCRIPTION OF THE INVENTION

This is a flow through processing unit apparatus, which consists of the following technologies: electromagnetics, oxidation and electrolytics, (EMOERU), arranged in such a manner to take full advantage of the synergistic physicochemical actions and reactions when these technologies are applied simultaneously in a confined environment in a specially designed processing unit.

Figure 1:
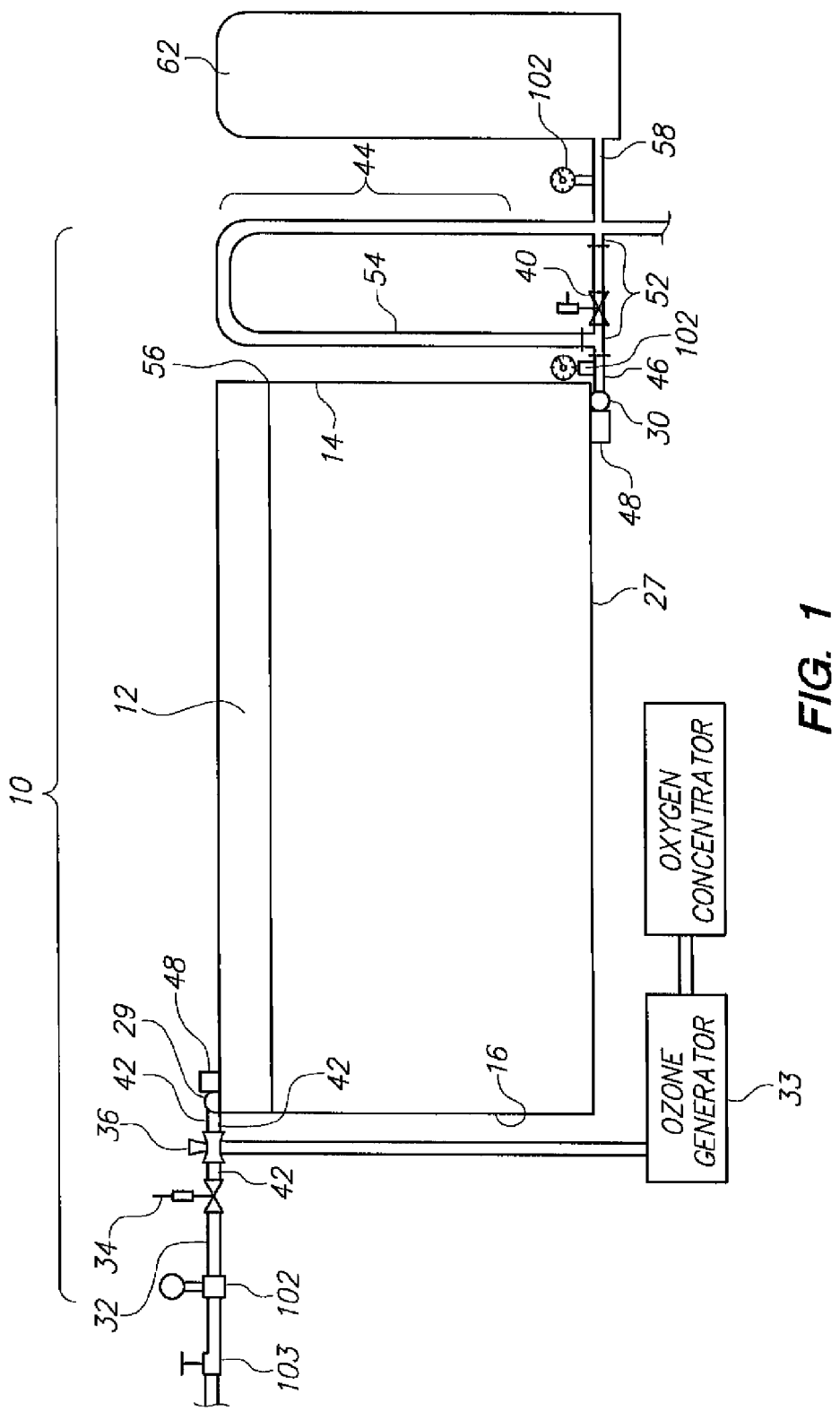
FIG. 1 is an exterior side view of the inventive processing unit comprising the invention.
Figure 2:
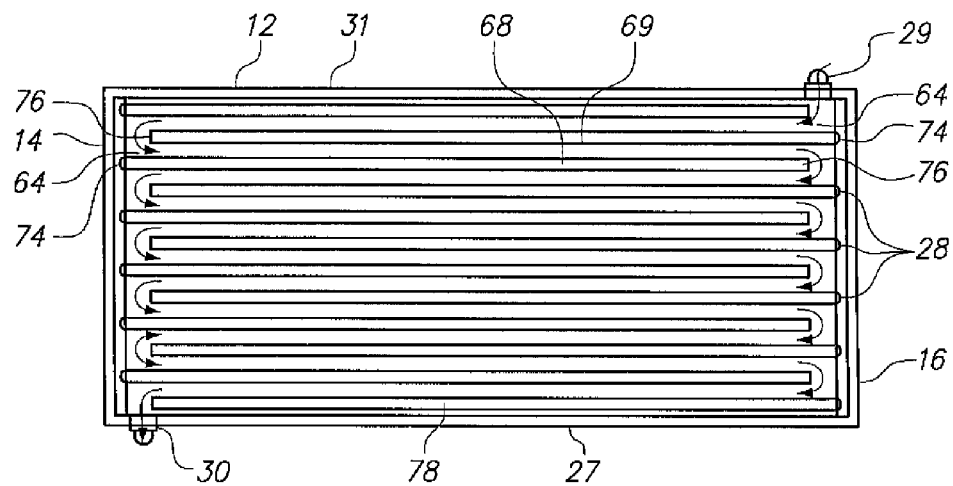
FIG. 2 is a perspective view of the inventive processing unit comprising the invention shown with its access lid removed so as to provide a full view of the maze unit.
Figure 3:
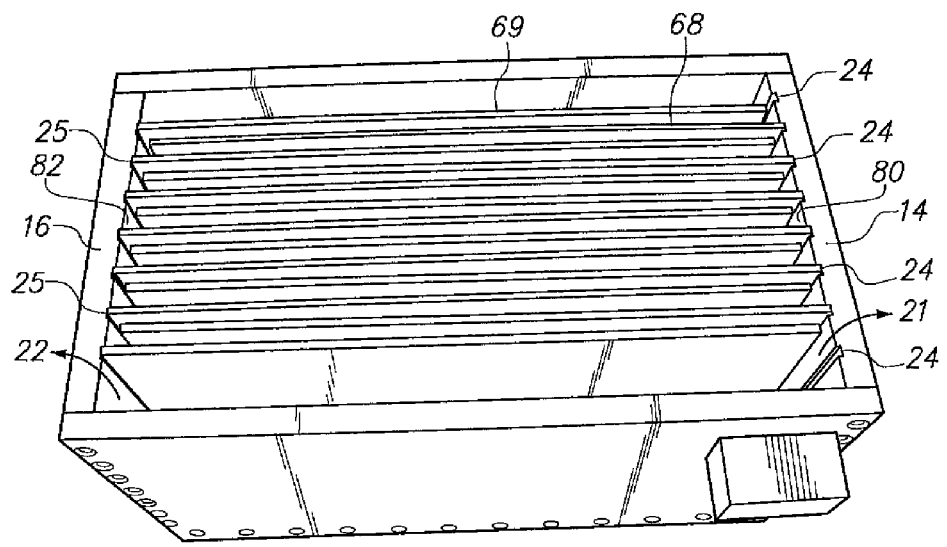
FIG. 3 is a plan view of the inventive processing unit, shown with the access lid removed and looking downward at the various plates comprising the maze unit.

Referring generally, to FIG. 1, the processing unit 10 is comprised of a rectangular housing 12 made of non-conductive material resistant to acids, caustics, organic and inorganic chemicals and contaminants, solvents, chlorinated hydrocarbons and ozone oxidation. The housing 12 is preferably capable of handling pressures of at least 60 psi and the exact dimensions of the housing is dependent upon the use to which it is applied. The housing dimensions can be modified for a specific non-variable contaminant and gpm flow rate at a permanent site without being at variance to this patent. Other internal dimensions and exact number of plates for a particular application may vary. As shown in FIGS. 2 and 3 the housing 12 has sidewalls 14, 16 which are grooved on their inner face where half of the grooves 24 contain treatment plates 68 which run from the inner face of a first sidewall 14 to within about a half-inch of and opposite, second sidewall 16.

The other half of the grooves 25 will contain plates 69 which run from the inner face 22 of the second sidewall 16 to within about a half inch of the first sidewall 14. These grooves 24, 25 are staggered so that when treatment plates 68, 69 are inserted into the grooves 24, 25 a horizontal maze unit 28 is formed.

In FIGS. 2 and 3 the housing 12 with associated plates 68, 69 is shown with its access lid (not shown) removed so that the plates can be seen in their horizontal orientation to form a horizontal maze unit 28. The horizontal maze unit 28 shown in FIG. 2 also shows aqueous waste stream effluent (effluent stream flow indicated by arrows) entering at the inlet 29 at the top side 31 of the housing 12, cycling across the various plates 68, 69 via gravity feed until the effluent reaches the outlet 30 located at the bottom side 27 of the housing 12.

Inlet 29 communicates with an input conduit 32 as shown in FIG. 1. Along the input conduit 32, processing apparatus can be included to act upon the aqueous waste stream prior to its entry into the maze unit 28 as shown in FIG. 1. One such apparatus is an electromagnet 34 as shown in FIG. 1. Another is a venturi injector 36 as shown in FIG. 1 to which oxidizing agents can be added to act upon the waste effluent stream. One such oxidizing agent would be ozone 33 as shown in FIG. 1, which would be introduced at the venturi injector 36 as shown in FIG. 1. Just after the venturi injector 36 is inlet 29 to the processing unit 10, through which an effluent waste stream is introduced to the horizontal maze unit 28 of treatment plates 68, 69 as shown in FIG. 2.

Still referring to the FIGS. 1 and 2 the processing unit has an outlet 30 with a drain valve 40 on the bottom. An output conduit 46 extends from outlet 30, which in turn connects to an inverted pipe configuration 44. The inverted pipe configuration 44 keeps water filled to the top of the water level in the housing 12 to prevent the processing unit 10 from shorting out. Drain valve 40 is located on output conduit 46. At the bottom 27, there is an outflow arrangement. This will consist of a flat offset spacer block 48 that the output conduit 46 is attached to. The output conduit 46 is sized to the unit's maximum flow rate. The output conduit 46 extends to connect to a "T" junction 52 which is connected to riser 54 off of the top of the "T" junction 52 which rises to the top fluid level 56 of a full treatment unit. Pipe configuration 44 also allows an extension 58 for the installation of other equipment if necessary for further reduction of contaminants beyond acceptable levels. For example, as shown in FIG. 1 the free flow output can then connect to a filtration system 62 including but not limited to nanoparticles, enhanced nanomagnetic particles, biologically activated granulated charcoal, etc. Flow will be outward from the outlet 30 from the last horizontal flow channel 78 of the unit as shown in FIG. 2.

Referring to FIGS. 2 and 3 the staggered arrangement of the treatment plates 68, 69 which comprise the horizontal maze unit 28 is shown. Between each pair of treatment plates 68, 69 is a channel 64 through which flows the effluent waste stream (arrows). Each channel 64 is bordered by two treatment plates 68, 69, one plate being an anode 68 and the other a cathode 69. The sidewalls 14, 16 of the housing 12 as shown on FIG. 1 have a slot (not shown) for the highly conductive metal contacts 71 as shown on FIG. 4 hold the anode or cathode treatment plates 68, 69 in place. A plate 68 nests in a first sidewall groove 24 at the plate's first end 74 and stops short of an opposing second sidewall 16 at the second end 76 of the plate 68, while the first end 74 of an alternate plate 69 nests in a groove 25 in the opposing second sidewall 16 and where the second end 76 of the alternate plate 69 stops short of the first sidewall 14. This alternating plate arrangement combines in a plurality of alternating plates 68, 69 to create the horizontal maze unit 28. The waste stream effluent travels through the flow channels 64 and flows in a vertical manner through each flow channel from inlet 29 to outlet 30. The plates are preferably at least ½-inch shorter than the distance between sidewalls 14, 16 plus an allowance for insertion of contacts 71. The material of the plates will and can be selected to meet the parameters of the waste stream. They can be mixed or matched. The plate's exact dimensions and number of plates will be dependent on the flow rate and the process time required. The aqueous waste stream, upon reaching the final channel 78 will leave the unit by the outlet 30 and the output conduit 46 as shown on FIG. 1. The number of treatment plates and therefore, the number of flow channels in the maze unit can be modified depending on the type of aqueous waste stream being treated. For example, a particular contaminant may require the waste stream to remain in the maze using for a certain time "x" before it is adequately treated. This time "x" is called the residence time. The number of plates and flow channels can be increased or decreased to achieve the appropriate residence time for a particular waste stream.

Referring to FIG. 3 the grooves 24, 25 imparted into the interior sidewalls 14, 16 of the housing 12 for mounting the treatment plates 68, 69 are shown. Grooves 24 are cut into the inner face 21 of a first sidewall 14 and grooves 25 are cut into the inner face 22 of a second sidewall 16. A first subset of anode plates 68 are inserted into the first sidewall grooves 24 and a second subset of cathode plates 69 are inserted into the second sidewall grooves 25. When the entire plurality of treatment plates 68, 69 are inserted into their respective first and second sidewall grooves, the plates 68, 69 comprise the maze unit 28 as shown on FIG. 2 and are positioned in a staggered relation. Both sidewalls 14, 16 are provided with two holes (not shown) at each groove 24, 25 for the mounting and securing of the contacts 71 as shown on FIG. 4 which are then connected to an power source 92 as shown on FIG. 6 to turn a plate into an anode plate 68 or a cathode plate 69.

Figure 4:
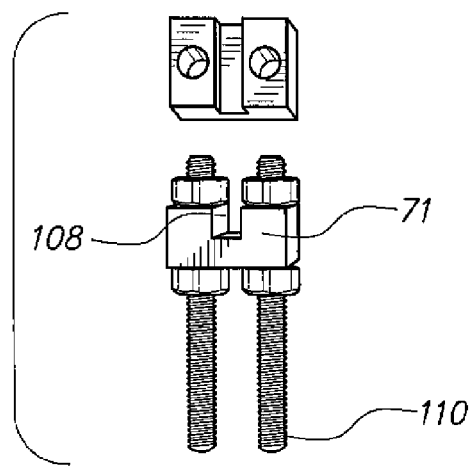
FIG. 4 is a perspective view of an electrical contact which is part of the invention.

Referring to FIG. 4, the contact 71 is shown. Contact 71 has a slot 108 into which is inserted a treatment plate 68, 69 and contacts 71 are inserted into slots (not shown) located in sidewalls 14, 16. Stud bolts 110 extend protrudingly outward from contact 71 and extend through sidewalls 14, 16. As demonstrated in FIG. 5, stud bolts 110 are protruding through sidewall 14. The ends 74 of cathode plates 68 reside in grooves 24 and in slot 108 of contact 71. Cables 72 as shown in FIG. 5 are attached to stud bolts 110 and to power source 92 (See FIG. 6).

Figure 5:
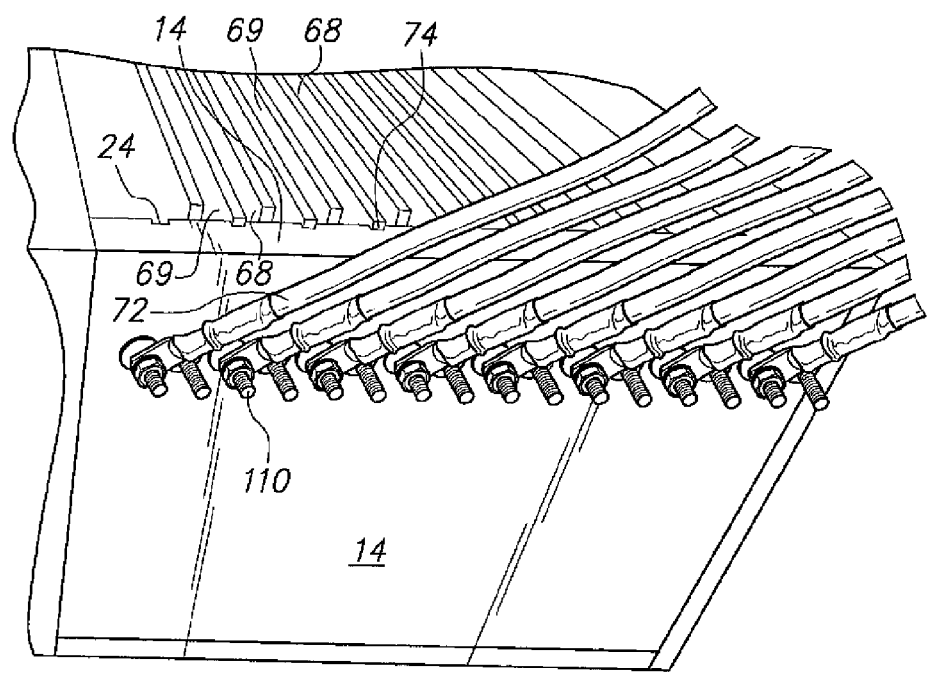
FIG. 5 is an exterior side view of the inventive processing unit.
Figure 6:
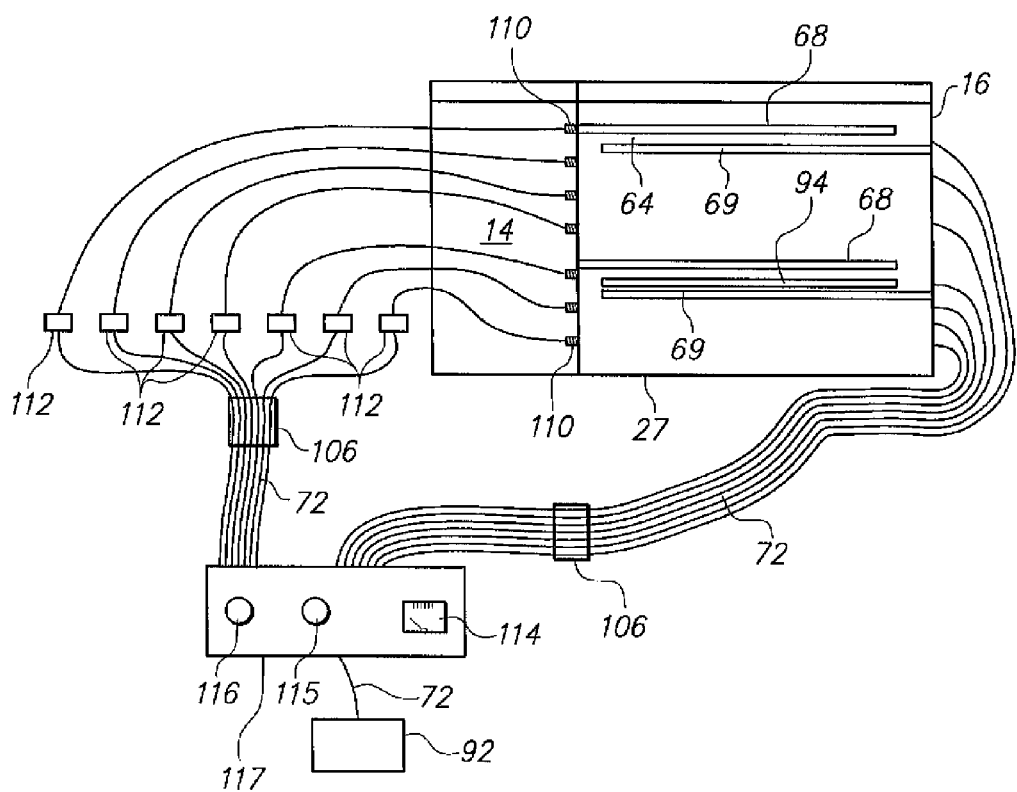
FIG. 6 is a plan view of an anode plate, a cathode plate and a membrane attached between the anode and cathode plates attached to various wiring and ammeter shunts which comprise the invention.

As shown in FIGS. 5 and 6 the protruding portion of the stud bolts 110 on the outside of the side walls 14, 16 will be the power connection points. At the positive sidewall 14 ammeter shunts 112 will connect to the stud bolts 110 and then the other end of the ammeter shunt 112 will connect to a power bus 106. At the negative sidewall 16 the stud bolt 110 will connect directly to the other power bus 106. The end of an anode plate 69 has all connections for one polarity while the other end has the cathode plate 68 connections. The shunts 112 are then connected to display ammeters 114 on the control panel 117 adjacent to the power unit's voltage 115 and current 116 controls. As there are two stud bolts 110, one to each side, and due to close proximity of the plates, the shunts are connected alternately to one stud or the other to avoid close proximity problems with the shunt mounting. These shunts provide the ability to monitor the amperage drawn by each set of plates to determine efficiency of the process and will also indicate the status and condition of each set of plates.

The sidewall grooves 24, 25 as shown on FIG. 3 are cut to a sufficient depth to hold the cathode and anode plates in place with approximately ⅜ inch spacing between plates. The sidewalls 14, 16 are of non-conductive material. Also, while FIGS. 2 and 3 show a side removed so that access to the plates 68, 69 can be gained, the housing 12 is entirely closed during operation and an access lid (not shown) is placed over the plates 68, 69 and held in a fluid tight manner with a gasket and bolts. As shown in FIGS. 2 and 3 the plates 68, 69 are removable once the cover is removed, thus allowing them to be serviced and inspected if necessary.

As shown in FIG. 6, the processing unit 10 preferably allows for the insertion of membranes 94 between the anode and cathode plates 68, 69 of each flow channel 64 in the horizontal maze unit 28. The membranes can be comprised of different materials as may be required for treatment of specific waste streams. These may be "doped" membranes 94 (chemically impregnated or other type of treatment but not limited to nanofiltration, nanoparticles or enhanced nanomagnetic particles or other forms).

There are pressure gauges or sensors 102 as shown on FIG. 1 on the unit. One will be on the input conduit 32 and the other on output conduit 46. This will indicate the pressure drop across the maze unit 28 and thus will be indicative of the unit flow status.

A volume control 103 allows the volume of influent aqueous waste stream to be regulated so as not to overwhelm the processing unit 10.

The voltage 115 and current 116 controls of either the AC or DC power to the plates allows the operator to set and/or adjust these two parameters to meet the demands to treat a particular contaminant or group of contaminants. In the DC mode of operation there will be a time adjustable relay to reverse plate polarity as best fits contamination process.

While it has been attempted to illustrate a preferred embodiment of the inventive concept incorporating electromagnetics, oxidation and electrolytics in a specifically designed synergistic physicochemical reaction flow through unit, (EMOERU), to take full advantage of their synergistic physicochemical interactions and reactions when they are applied simultaneously within a confined processing unit, it is wished to be limited not by the specific embodiments illustrated but only by the scope of the appended claims.

What is claimed is:

1. An apparatus for removing contaminants from an aqueous waste stream comprising:
   a housing;
   a source of electrical current connected to a plurality of pairs of treatment plates;
   a source of an electromagnetic field positioned such that said aqueous waste stream passes through said electromagnetic field as said aqueous waste stream enters into said housing;
   a source of ozone for introducing ozone into said aqueous waste stream as said aqueous waste stream enters into said housing;
   wherein said plurality of pairs of treatment plates define at least one flow channel for introducing said aqueous waste stream there into, and;
   wherein said pairs of treatment plates comprise an anode and a cathode; and
   each of said anodes is affixed to a first end of said housing and is shorter than said housing such that a first gap exists between said anode and an opposing end of said housing; and
   each of said cathodes is affixed the opposing end of said housing and is shorter than said housing such that a second gap exists between said cathode and said first end of said housing.

2. The apparatus recited in claim 1, wherein said opposing treatment plates are arranged horizontally to achieve a vertical fall of said aqueous waste stream through said housing.

3. An apparatus for removing contaminants from an aqueous waste stream comprising in combination:
   a source of electrical current connected to a plurality of treatment plates;
   a source of ozone for introducing ozone into said aqueous waste stream in the form of bubbles;
   a housing, said housing having at least first and second opposing sidewalls, said at least first and second opposing sidewalls further comprising a plurality of grooves imparted into said sidewalls;
   wherein each of said plurality of treatment plates is inserted into one of said sidewall grooves, said treatment plates being of a length slightly short of said distance between said at least first and second opposing sidewalls, said plurality of treatment plates further being arranged in a staggered manner such that a first subset plurality of said plurality of treatment plates comprise cathode plates and wherein a second subset plurality of said plurality of treatment plates comprise anode plates; said plurality of treatment plates defining at least one flow channel, for introducing said aqueous waste stream there into.

4. The apparatus as recited in claim 3, wherein said plurality of treatment plates are arranged horizontally to achieve a vertical fall of said aqueous waste stream through said flow channels.

5. The apparatus as recited in claim 3 further comprising an input conduit for delivering said aqueous waste stream to said apparatus, including a volume control for controlling the volume of said aqueous waste stream being introduced to said apparatus.

6. The apparatus as recited in claim 3, further comprising an output conduit with a control valve to provide a method of draining said apparatus.

7. The apparatus as recited in claim 3 wherein said housing can be sized with an appropriate number of flow channels to meet requirements of treatment residence times for removal of contaminants from said aqueous waste stream.

8. The apparatus as recited in claim 3 further comprising membranes between said anode and said cathode treatment plates.

9. The apparatus as recited in claim 8, wherein said membranes are nanofilters and or nanoparticle or nanomagnetic impregnated filters.

10. The apparatus as recited in claim 3 further comprising a nanotechnology-based filter unit positioned such that said aqueous waste stream flows there through after exiting said housing.

11. An apparatus for removing contaminants from an aqueous waste stream comprising in combination:
    a source of electrical current for providing electrical current to a plurality of pairs of treatment plates;
    a source of an electromagnetic field positioned such that said aqueous waste stream passes through said electromagnetic field;
    a source of ozone for introducing ozone into said aqueous waste stream;
    a housing, said housing having at least first and second opposing sidewalls, said sidewalls further comprising a plurality of grooves imparted into said sidewalls;
    wherein each of said plurality of treatment plates is inserted into a one of said sidewall grooves, said treatment plates being of a length slightly short of said distance between said opposing sidewalls, said plurality of treatment plates further being arranged in a staggered manner such that each of a first subset plurality of said plurality of treatment plates is inserted into said first sidewall grooves at a first end of said first subset plurality of said plurality of treatment plates and wherein a second end of each of said first subset plurality of said plurality of treatment plates is free-standing a short distance short of said second sidewall;

wherein each of a second subset plurality of said plurality of treatment plates is inserted into said second sidewall grooves at a first end of said second subset plurality of said plurality of treatment plates and wherein a second end of each of said second subset plurality of said plurality of treatment plates is free-standing a distance short of said first sidewall;

said plurality of treatment plates defining a plurality of flow channels, wherein a pair of opposing treatment plates define a flow channel for introducing said aqueous waste stream there into, wherein said opposing treatment plates defining said flow channel comprise an anode and a cathode;

an input conduit communicating with an entry of said housing;

an output conduit communicating with an exit of said housing; and a pressure sensing device communicating with both said input conduit and said output conduit to sense a pressure differential across the apparatus.

12. The apparatus as recited in claim 11, further comprising a control valve attached to said output conduit to provide a method of draining said housing.

13. The apparatus as recited in claim 12, further comprising a volume control attached to said input conduit for controlling the volume of said aqueous waste stream being introduced to said apparatus.

14. The apparatus as recited in claim 11, wherein said housing and said treatment plates can be sized to provide an appropriate number of flow channels to meet requirements of treatment residence times for removal of contaminants from said aqueous waste stream.

15. The apparatus as recited in claim 11, further comprising membranes between said anode and said cathode treatment plates.

16. The apparatus as recited in claim 15, wherein said membranes are nanofilters and or nanoparticle or nanomagnetic impregnated filters.

17. The apparatus as recited in claim 11 further comprising a nanotechnology-based filter unit affixed to said output conduit such that the aqueous waste stream passes there through.

* * * * *